United States Patent [19]

Melling, Jr.

[11] Patent Number: 4,752,927
[45] Date of Patent: Jun. 21, 1988

[54] SYNCHRONOUS CHANGEOVER

[75] Inventor: Laurent A. Melling, Jr., Scappoose, Oreg.

[73] Assignee: Tektronix, Inc., Beaverton, Oreg.

[21] Appl. No.: 850,000

[22] Filed: Apr. 9, 1986

[51] Int. Cl.$^4$ .................... H04J 1/16; G06F 11/20
[52] U.S. Cl. .................... 371/8; 340/825.01; 340/825.77; 370/16
[58] Field of Search .................... 371/8, 9; 370/16; 328/112, 116; 307/234, 351; 340/825.01, 825.77

[56] References Cited

U.S. PATENT DOCUMENTS

| | | | |
|---|---|---|---|
| 2,974,286 | 3/1961 | Meyer | 328/116 |
| 3,790,881 | 2/1974 | Smith | 328/112 |
| 3,980,960 | 9/1976 | Hutchinson | 328/112 |
| 4,159,470 | 6/1979 | Strojny et al. | 371/8 |
| 4,214,270 | 7/1980 | Morito | 328/112 X |
| 4,254,496 | 3/1981 | Munter | 370/16 |
| 4,506,357 | 3/1985 | Nakayashiki et al. | 370/16 |
| 4,623,884 | 11/1986 | Ihara et al. | 340/825.05 |
| 4,627,045 | 12/1986 | Olson et al. | 371/8 X |
| 4,639,618 | 1/1987 | Oleson | 328/116 |

Primary Examiner—Charles E. Atkinson
Attorney, Agent, or Firm—Francis I. Gray

[57] ABSTRACT

A synchronous changeover device detects both peak amplitude and pulse width, automatically switching between sets of signals without a noticeable glitch when a fault is detected. The signals of each set are peak detected and combined so that if any signal of a set falls below a predetermined value a FAIL signal is output to a switch timing and control circuit. The FAIL signal, together with the sync signals from the sets of signals, causes an electronic switch to switch from one set of inputs to another between sync pulses, resulting in a synchronous changeover. Further the signals are input to a start/stop counter via a multiplexer under control of a microprocessor. The counter counts the number of pulses of a reference signal between the start and stop of a selected signal pulse, and the microprocessor determines if the pulse width is within acceptable limits. Out of limits pulse widths cause the microprocessor also to generate the FAIL signal to automatically switch between sets of signals.

8 Claims, 3 Drawing Sheets

SYNCHRONOUS CHANGEOVER

BACKGROUND OF THE INVENTION

The present invention relates to changeover devices which take signals from two sources and route one set or the other to an output, and more particularly to a synchronous changeover device for a television studio using an electronic switch to automatically switch beteween sets of synchronization signals without a noticeable glitch when a fault occurs.

Prior art changeovers in the television industry incorporate an automatic changeover only if an input falls below a certain rms amplitude. This re-routing takes place through a set of relay contacts which may take many milliseocndds to stop bouncing. This relay "chatter" is propagated throughout a television studio and causes loss of sync which appears as noise on a television monitor for approximately 100 lines or so. Further since these prior art changeovers look at the rms amplitude, a signal having a short duty cycle with high amplitude may be detected as equal to a signal having a long duty cycle with low amplitude. The result is that due to this lack of precision the changeovers may not detect all failure modes.

What is desired is a changeover device which automatically detects faults with a higher degree of assurance and switches signal sets without a noticeable glitch.

SUMMARY OF THE INVENTION

Accordingly the present invention provides a synchronous changeover device which detects both peak amplitude and pulse width, and which automatically switches between sets of signals without a noticeable glitch when a fault is detected. The signals of each set are each input to peak detectors and the outputs of the peak detectors are combined in a NAND gate so that if any signal of a set falls below a predetermined value the NAND gate outputs a FAIL signal to a switch timing and control circuit. Together with the sync signals from the sets of signals, the FAIL signal via the switch timing and control circuit causes an electronic switch to switch from one set of inputs to another between sync pulses, resulting in a synchronous changeover between sets of signals. Additionally the signals of the selected set are input via a multiplexer to a start/stop counter under control of a microprocessor. The start/stop counter counts the number of pulses of a reference signal between the start and stop of a selected signal pulse to determine the pulse width or duty cycle. If the pulse width is too short or too long, the microprocessor outputs a FAIL signal to the switch timing and control circuit to switch signal sets. Thus both the amplitude and pulsewidth of the signals of a set are tested for a failure condition, with automatic switching to the other set of signals occurring when a failure is detected.

The objects, advantages and novel features of the present invention will be apparent from the following detailed description when read in conjunction with the appended claims and attached drawing.

DESCRIPTION OF THE PREFERRED EMBODIMENT

Figure 1:
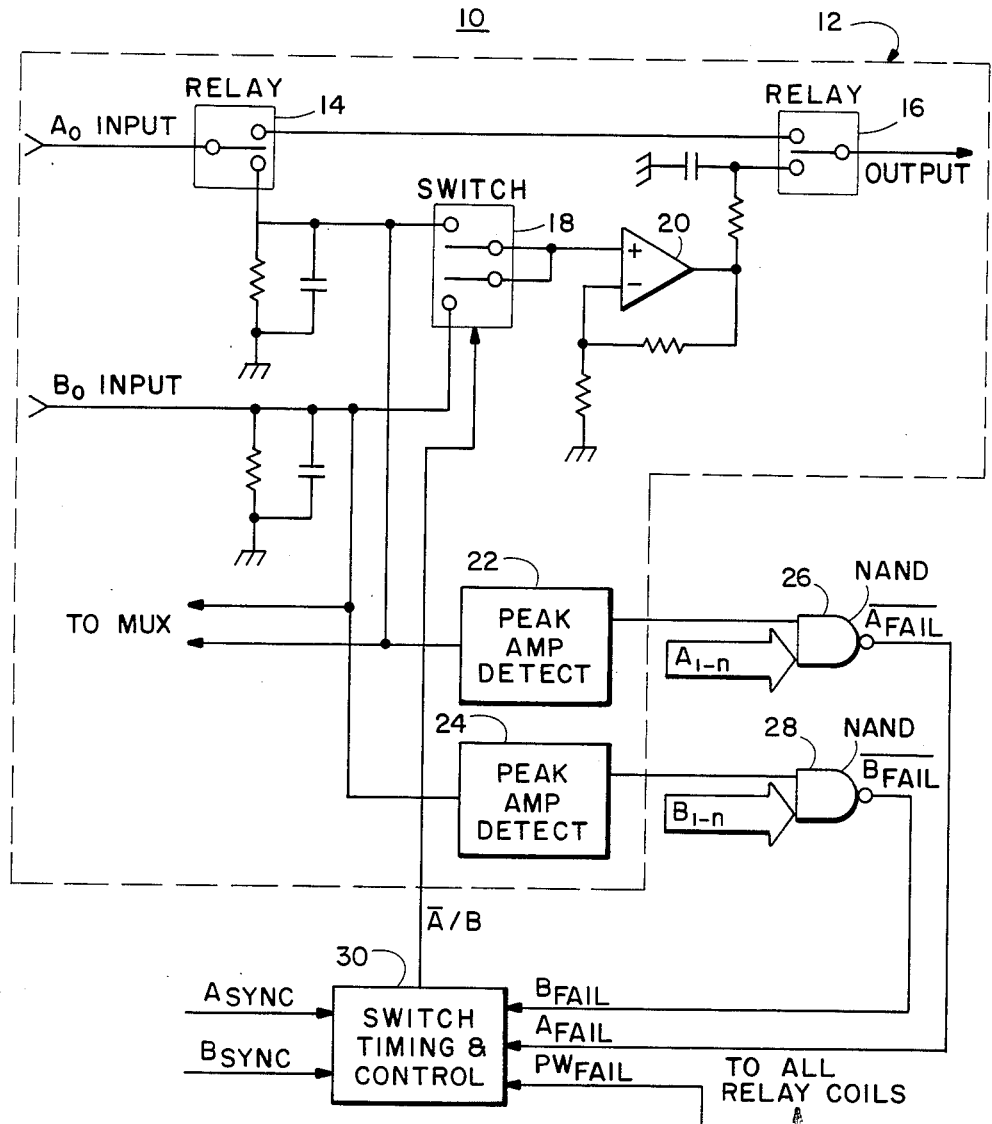
FIG. 1 is a block diagram view of a synchronous changeover device according to the present invention.
Figure 1:
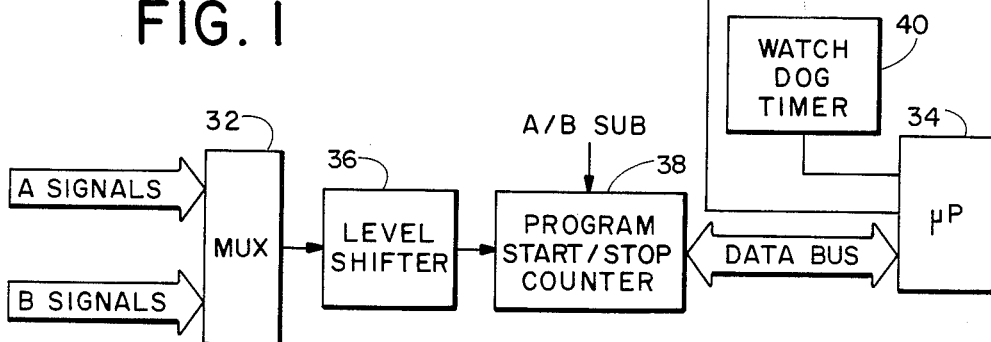

Referring now to FIG. 1 a synchronous changeover device 10 is shown. Two synchronized signals, A and B, are input to the changeover device 10, each signal being broken into a set of component signals. For example, for a standard television broadcast signal the component signals may be composite sync, horizontal sync, vertical blanking, composite video, subcarrier, burst frequency or the like. Each component signal pair, i.e., the component signal from A and the corresponding component signal from B, is input into a switch/detector circuit 12 which outputs the component signal corresponding to the selected set of signals, either A or B. The A component is input to an input standard mechanical relay 14. One output of the input relay 14 is input to one terminal of an output standard mechanical relay 16. The other output of the input relay 14 is connected to one pole of an electronic switch 18. The B component is input to the other pole of the electronic switch 18, with the output of the switch via an amplifier 20 being connected to the other terminal of the output relay 16. The selected set of signals, A or B, appears at the output of the output relay 16 when the relay is energized.

From the inputs to the electronic switch 18 each component signal, Ao or Bo being representative component signals, is input to respective peak amplitude detector circuits, 22 and 24. The output of the peak detectors 22, 24 is a logical "1" if the detected peak amplitude for the component signals is within a predetermined range, indicating the presence of that component signal. All the A component signals are input to a first NAND gate 26 and all the B component signals are input to a second NAND gate 28. If the amplitude of any component signal is outside the predetermined range, the output of the corresponding peak detector 22, 24 is a logical "0" and the output of the corresponding NAND gate 26, 28 indicates a signal failure. The absence of a component signal, as indicated by a FAIL signal, is input to a switch timing and control circuit 30 from the respective NAND gates 26, 28 together with the component sync signals, Async and Bsync. In response to the FAIL signal a switch signal from the switch timing and control circuit 30 is applied to each electronic switch 18 to switch the signal at the output of the switch to the set of signals which has not failed, i.e., if there is an absence of an A component signal then the switch will switch the B component signals to the respective outputs.

The A and B component signals are also input to a multiplexer 32 which operates under control of a microprocessor 34. The selected output of the multiplexer 32 is input via a level shifter 26 to a programmable start/stop counter 38. Also input to the start/stop counter 38 is a reference signal, such as the appropriate subcarrier signal corresponding to the component signal passed by the multiplexer 32. The start/stop counter 38 acts as a pulse width detector by starting to count when the leading edge of a pulse of the selected component signal from the multiplexer 32 is detected, counting the cycles of the reference signal, and stopping the count when the trailing edge of the pulse is detected. The resulting pulse width count from the start/stop counter 38 is input to the microprocessor 34 which determines whether the pulse is valid, i.e., is within a predetermined range. If the pulse width is not within the predetermined range, the microprocessor 34 outputs a pulse width failure signal to the switch timing and control circuit 30. If the component signal which has a pulse width failure is from the selected set of signals, then the switch timing and control circuit 30 switches all the electronic switches 18 so that the opposite set of signals is selected.

Figure 2:
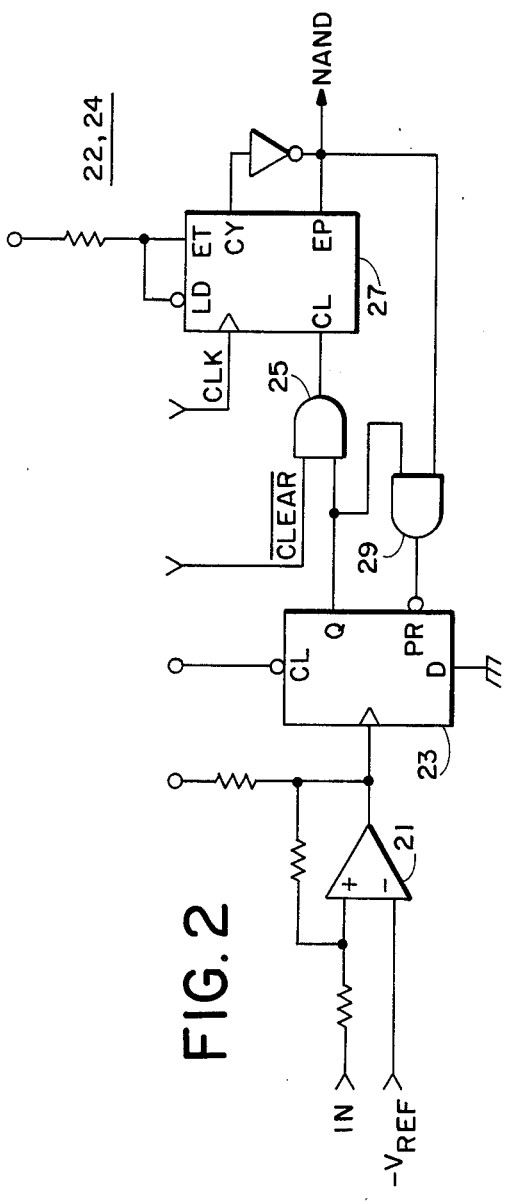
FIG. 2 is a schematic diagram view of a first type of peak detector for use in the synchronous changeover device of the present invention.
Figure 3:
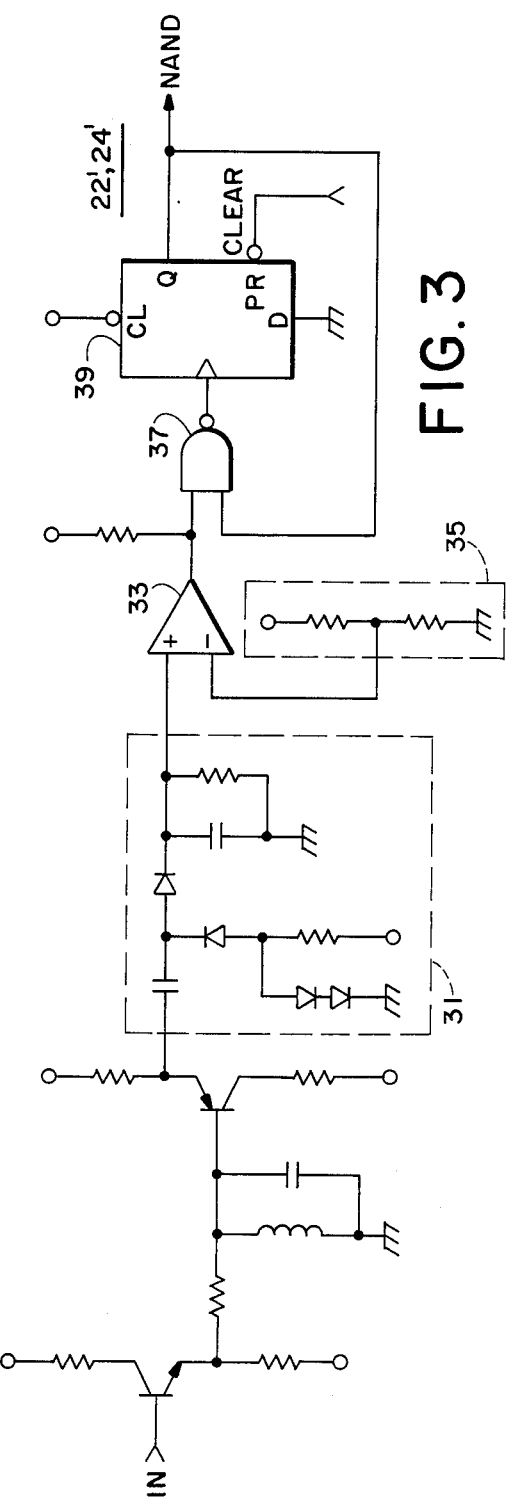
FIG. 3 is a schematic diagram view of a second type of peak detector for use in the synchronous changeover device of the present invention.

FIGS. 2 and 3 illustrate two types of peak detectors 22, 24 or 22', 24' depending upon the type of component signal input. For pulse type signals such as sync, blanking and the like the circuit of FIG. 2 is used. For periodic signals such as subcarrier the circuit of FIG. 3 is used. Referring to FIG. 2 the component signal, such as horizontal sync, is input to a comparator 21 which acts as a level shifter so long as the pulse amplitude exceeds a reference voltage, Vref. The output of the comparator 21 clocks a D-type flip-flop 23 for each pulse input, causing the Q output of the flip-flop to go low since the D input is tied low. An AND gate 25 is enabled by a /CLEAR signal and passes the Q low output to the clear terminal of a counter 27 to restart the count of the pulses of a reference CLK. If there is no carryover, CY is low and the output to the NAND gate 26, 28 is high, as is the input to a second AND gate 29. The output of the second AND gate 29 is tied to the program reset terminal of the flip-flop 23 such that Q is returned to a high when the output of the AND gate is low. Thus, the flip-flop 23 converts the input pulse to an edge trigger pulse. If an input pulse is missing or has a low amplitude, there is no output from the comparator 21 at that time, and hence no clear pulse to the counter 27. The counter 27 overflows setting the carryover to high, resulting in a low to the NAND gate 26, 28, indicative of a failure, and to the second AND gate 29, inhibiting the gate so that the Q output of the flip-flop 23 is locked high until cleared.

The other type of detector shown in FIG. 3 is used for sinusoidal signals, such as subcarrier. The input signal is buffered, bandpass filtered and amplified before being rectified by a peak detector circuit 31. The output of the peak detector circuit 31 is a dc level which is input to a comparator 33 which outputs a high value when the dc level exceeds a reference voltage, provided by a voltage divider network 35. The output of the comparator 33 is input to a NAND gate 37, the output of which clocks a D-type flip-flop 39. The Q output of the flip-flop 39 is input to the NAND gate 37 to enable the gate so that when the output of the comparator 33 goes low, the flip-flop output goes low indicating a failure to the NAND gate 26, 28 and locking out further clock pulses to the flip-flop via the NAND gate 37 until the flip-flop is cleared.

Figure 4:
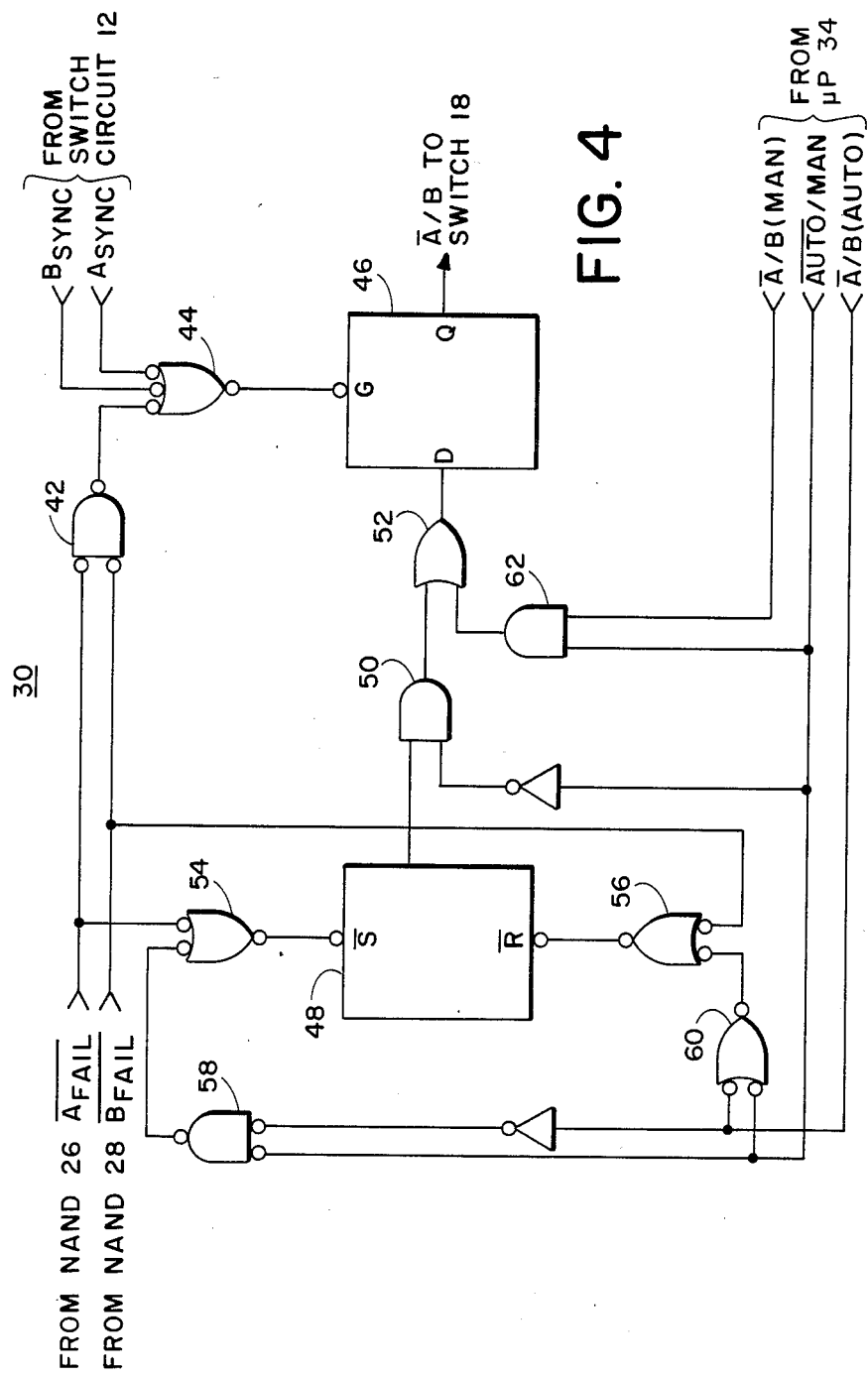
FIG. 4 is a schematic diagram view of a switch timing and control circuit for use in the synchronous changeover device of the present invention.

The switch timing and control circuit 30 is shown in greater detail in FIG. 4. The failure signals from the NAND gates 26, 28 are input to a first gate 42, the output of which is one input to a second gate 44. The other inputs to the second gate 44 are the Async and Bsync signals. The output of the second gate 44 is input to the gate input of a transparent latch 46. If both inputs to the first gate 42 are low, indicating a failure of a component signal from each set, the output of the first gate goes low, inhibiting the second gate 44 so no switching can take place since both channels are at fault. Otherwise, the second gate 44 is enabled by the output of the first gate 42 and in the interval between the sync pulses of the Async and Bsync signals the other inputs of the second gate are high so that a gate pulse is generated at the trailing edge of a sync pulse when both Async and Bsync are between sync pulses. The gate pulse causes the output of the latch 46 to reflect the input, i.e., to remain the same if no failure occurs or to switch if the selected set of signals reflects a fault.

An S/R flip-flop 48 provides the automatic switching input via AND gate 50 and OR gate 52 to the latch 46. If there is a failure of an A component signal, a pulse is applied to the set terminal of the S/R flip-flop 48 via gate 54 to command the latch 46 to switch to B. Alternatively if B is selected and there is a failure of a B component signal, then the reset terminal of the S/R flip-flop 48 has a pulse applied via gate 56 which changes the output from the S/R flip-flop and the corresponding input to the latch 46. Likewise if the error is detected by the microprocessor 34 due to a pulse width fault, an auto/manual signal from the microprocessor enables gates 58 and 60 so that the signal representing the set of signals to be selected may be applied to the gates 54, 56 as described above. Additionally transition from A to B may be made manually via AND gate 62. The manual command from the microprocessor 34 locks out the S/R flip-flop by causing AND gate 50 to have a constant low output which enables OR gate 52 to receive manual transitions. The manual command also enables AND gate 62 so that the manual switch command is passed through gates 62 and 52 to the latch 46, with the actual switch command being generated as described above.

In operation when power is off the relays 14, 16 are in the up position, i.e., A is connected via the relays directly to the output. After power is applied and the microprocessor 34 has completed its self-test routines, the relays 14, 16 are pulled down so that A is now input to the electronic switch 18. The relay coils are controlled by a watch dog circuit 40 which pulls the relays down upon computer command and holds them in that position so long as the watch dog timer is periodically being reset by the microprocessor 34. If the microprocessor 34 has a power failure or a glitch, the watch dog timer 40 times out and the relays 14, 16 are returned to their up position. Also, the A signal generator (not shown) is powered from one source and the B signal generator (not shown) and the switch and detector circuits 12 are powered from a different source so that if A loses power, B is still passed through the switch circuits, but if B loses power the relays return to their up position and A is passed to the output. Without accessing the microprocessor 34 if there is a signal dropout among the component signals selected for output, i.e., the amplitude falls below a predetermined level, a signal is sent to the timing and control circuit 30 which switches all the electronic switches 18 when the two sync signals are in the same state, i.e., between sync pulses, so the opposite set of signals is selected. The microprocessor 34 tests the pulse widths via the start/stop counter 38 and sends a fault output to the timing and control circuit 30 when an invalid pulse width is detected. Thus, since the switching time of the electronic switch 18 is very small compared to the duration of a horizontal line, the switching occurs within one line without loss of synchronization and without a noticeable glitch on any piece of equipment.

Therefore, the present invention provides a synchronous changeover device which allows automatic changeover from one signal set to another without a noticeable glitch when a fault is detected in the one set by detecting the peak amplitudes and pulse widths of the component signals and outputting an error signal when one signal falls outside a predetermined range. The error signal causes an electronic switch to switch the signal set being output within one horizontal line between sync pulses.

What is claimed is:

1. A synchronous changeover device comprising:
   means for selecting electronically between one set of signals and another set of signals;
   means for detecting when the peak amplitude of any signal within a set selected by the selecting means falls below a predetermined value to generate a fault signal; and
   means responsive to the fault signal for generating a switch signal to cause the selecting means to select the other set of signals.

2. A synchronous changeover device as recited in claim 1 further comprising means for detecting an invalid pulse width for any signal within the set selected by the selecting means to generate the fault signal.

3. A synchronous changeover device as recited in claim 2 wherein the pulse width detecting means comprises:
   means for selecting one of the signals of the selected set;
   means for counting the pulses of a reference signal between the start and stop of a pulse of the selected signal; and
   means for determining from the count of the counting means whether the pulse of the selected signal is within acceptable limits, generating the fault signal when the pulse of the selected signal is outside acceptable limits.

4. A synchronous changeover device as recited in claim 1 further comprising means for selecting a specified one of the sets of signals when electrical energy is unavailable to the electronically selecting means.

5. A synchronous changeover device as recited in claim 4 wherein the specified set selecting means comprises:
   an input relay having a first output connected to an input of the electronically selecting means, and an input connected to the specified set;
   an output relay having an output, a first input connected to a second output of the input relay, and a second input connected to the output of the electronically selecting means; and
   means for energizing the input and output relays such that, when electrical energy is unavailaable to the electronically selecting means, the specified set passes directly from the input of the input relay to the output of the output relay.

6. A synchronous changeover device as recited in claim 1 wherein the electronically selecting means comprises a plurality of electronic switches, each electronic switch having as inputs corresponding signals from the sets of signals and as a switching signal the fault signal, the electronic switches being configured so that the outputs represent the complete set of signals of one set, the presence of the fault signal causing each electronic switch to switch states so that the outputs represent the complete set of signals of another set.

7. A synchronous changeover device as recited in claim 1 wherein the peak amplitude detecting means comprises:
   a peak detector for each signal of the selected set having as an input the output of the electronically selecting means corresponding to one of the signals of the selected set and providing an output value when the input exceeds a predetermined threshold value; and
   means for combining the outputs of the peak detectors so that the fault signal is generated when any one of the peak detectors fails to have the output value.

8. A synchronous changeover device as recited in claim 1 wherein the generating means comprises a switch timing and control circuit having as inputs the fault signal and the corresponding sync signals from the sets, the circuit generating a switch signal to the electronically selecting means to select another set between sync signals upon receiving the fault signal.

* * * * *